(12) United States Patent
Yao-Tsung

(10) Patent No.: US 9,126,284 B2
(45) Date of Patent: Sep. 8, 2015

(54) METHOD FOR PRODUCING A METAL CONTAINER

(71) Applicant: Kao Yao-Tsung, Tainan (TW)

(72) Inventor: Kao Yao-Tsung, Tainan (TW)

( * ) Notice: Subject to any disclaimer, the term of this patent is extended or adjusted under 35 U.S.C. 154(b) by 437 days.

(21) Appl. No.: 13/622,403

(22) Filed: Sep. 19, 2012

(65) Prior Publication Data

US 2014/0076880 A1   Mar. 20, 2014

(51) Int. Cl.
*B23K 20/12* (2006.01)
*B23K 11/11* (2006.01)
*B23K 11/14* (2006.01)
*B23K 11/18* (2006.01)
*B23K 11/20* (2006.01)

(52) U.S. Cl.
CPC ............... *B23K 11/115* (2013.01); *B23K 11/14* (2013.01); *B23K 11/185* (2013.01); *B23K 11/20* (2013.01); *B23K 2201/12* (2013.01); *B23K 2203/02* (2013.01); *B23K 2203/20* (2013.01)

(58) Field of Classification Search
CPC .. B23K 20/12; B23K 20/129; B23K 20/2275; B23K 20/2336; B23K 2201/38; B23K 2203/04; B23K 2203/10; B23K 2203/20; B23K 35/002
See application file for complete search history.

(56) References Cited

U.S. PATENT DOCUMENTS

| | | | | |
|---|---|---|---|---|
| 3,515,208 A | * | 6/1970 | Karmazin | 165/178 |
| 2006/0264906 A1 | * | 11/2006 | Pal | 604/523 |
| 2011/0089153 A1 | | 4/2011 | Kao | |

\* cited by examiner

*Primary Examiner* — Erin Saad
(74) *Attorney, Agent, or Firm* — Alan D. Kamrath; Kamrath IP Lawfirm, P.A.

(57) ABSTRACT

A method for producing a metal container includes providing first and second metals. The first metal has a first melting point, and the second metal has a second melting point higher than the first melting point. The first metal is adapted to form an engagement portion. The second metal is in the form of a container having a bottom plate. The first metal has first and second faces. The bottom plate has an outer face. The method further includes positioning the first metal on the bottom plate and heating the first and second metals until the first metal turns into a semi-molten state. The method further includes rotating and compressing a mold onto the first face in order to distribute the semi-molten first metal along the outer face to form the engagement portion. The method further includes removing the mold and engaging a heating member with the engagement portion.

13 Claims, 7 Drawing Sheets

METHOD FOR PRODUCING A METAL CONTAINER

BACKGROUND OF THE INVENTION

1. Field of the Invention

The present invention generally relates to a method for producing a metal container and, more particularly, to a method for producing a metal container having a heating member.

2. Description of the Related Art

A metal container generally consists of aluminum and stainless steel. The aluminum is coupled with the stainless steel. The stainless steel is in the form of a container for containing foods (or water) to be heated. An electric heating tube is coupled with the aluminum to form the metal container. When the electric heating tube is electrified to generate heat, the aluminum is able to transfer the heat to the container (stainless steel), thereby heating the content inside the container. However, the aluminum is coupled with the stainless steel by way of welding and adhesion, which does not provide an excellent engaging effect between the aluminum and the stainless steel. As a result, the ability of the aluminum to transfer the heat from the electric heating tube to the container (stainless steel) is affected. The conventional metal container also has an inefficient manufacture under the welding or adhesion process between the aluminum the stainless steel.

In light of this, it is necessary to provide a method for producing a metal container having a heating member.

SUMMARY OF THE INVENTION

It is therefore the objective of this invention to provide a method for producing a metal container having a heating member.

In a preferred embodiment, a method for producing a metal container is disclosed. The method includes providing a first metal and a second metal. The first metal has a first melting point, and the second metal has a second melting point higher than the first melting point. The first metal is adapted to form an engagement portion. The second metal is in the form of a container having a bottom plate. The first metal has a first face and a second face opposite to the first face. The bottom plate has an outer face facing the first metal. The method further includes positioning the first metal on the bottom plate of the second metal, such that the second face of the first metal is in contact with the outer face of the bottom plate. The method further includes heating the first and second metals until the first metal turns into a semi-molten state. The method further includes rotating and compressing a mold onto the first face of the first metal in order to distribute the semi-molten first metal along the outer face of the second metal to form the engagement portion on the first surface of the first metal. The method further includes removing the mold from the first metal and engaging a heating member with the engagement portion of the first metal.

In a preferred form shown, the positioning step further comprises welding the first metal on the bottom plate of the second metal by spot welding or projection welding.

In the preferred form shown, the rotating and compressing step further comprises rotating the mold in an increasing speed as the mold is constantly being compressed down on the first face of the first metal.

In the preferred form shown, the removing step further comprises removing the mold from the first metal by raising the mold.

In the preferred form shown, the rotating and compressing step comprises rotating the mold in a first direction as the mold is constantly being compressed down on the first face of the first metal. The removing step further comprises rotating the mold in a second direction opposite to the first direction as the mold is constantly being raised from the first metal.

In the preferred form shown, the first metal is aluminum, and the second metal is stainless steel. The heating step further comprises heating the aluminum and the stainless steel to approximately 400 degrees Celsius.

In the preferred form shown, the heating step comprises heating the first and second metals by way of radiofrequency.

In the preferred form shown, the heating member is an electric heating tube.

A method for combining two metals of a metal container is also disclosed. The method includes providing a first metal and a second metal.

The first metal has a first melting point, and the second metal has a second melting point higher than the first melting point. The first metal is adapted to form an engagement portion. The second metal is in the form of a container having a bottom plate. The first metal has a first face and a second face opposite to the first face. The bottom plate has an outer face facing the first metal. The method further includes positioning the first metal on the bottom plate of the second metal, such that the second face of the first metal is in contact with the outer face of the bottom plate. The method further includes heating the first and second metals until the first metal turns into a semi-molten state. The method further includes rotating and compressing a mold onto the first face of the first metal in order to distribute the semi-molten first metal along the outer face of the second metal to form the engagement portion on the first surface of the first metal. The method further includes removing the mold from the first metal.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
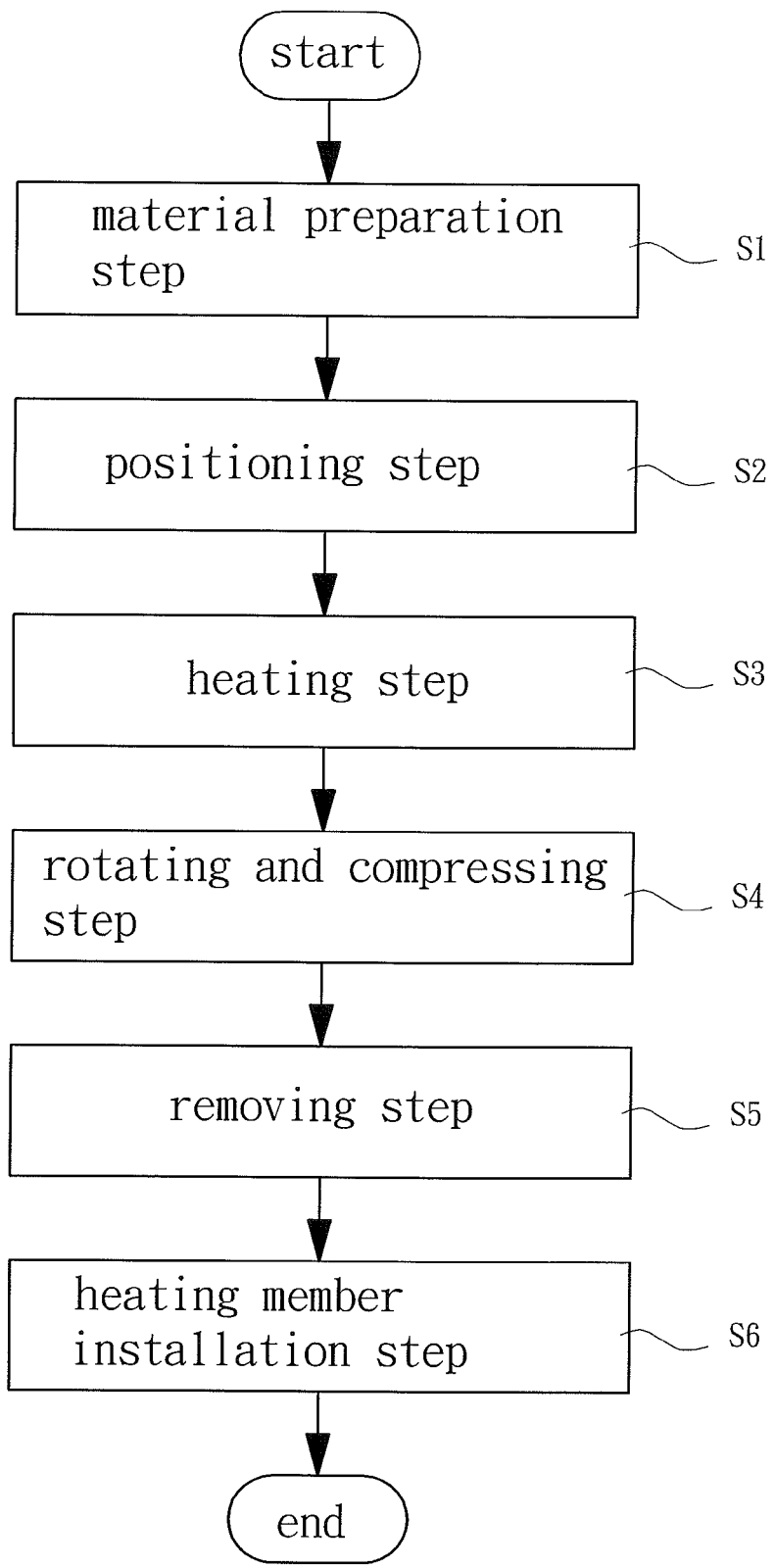
FIG. 1 shows a flowchart of a method for producing a metal container according to a preferred embodiment of the invention.

In the various figures of the drawings, the same numerals designate the same or similar parts. Furthermore, when the terms "first", "second", "third", "fourth", "inner", "outer", "top", "bottom", "front", "rear" and similar terms are used hereinafter, it should be understood that these terms have reference only to the structure shown in the drawings as it would appear to a person viewing the drawings, and are utilized only to facilitate describing the invention.

DETAILED DESCRIPTION OF THE INVENTION

FIG. 1 shows a flowchart of a method for producing a metal container according to a preferred embodiment of the invention. The method comprises a material preparation step S1, a positioning step S2, a heating step S3, a rotating and compressing step S4, a removing step S5 and a heating member installation step S6.

Figure 2:
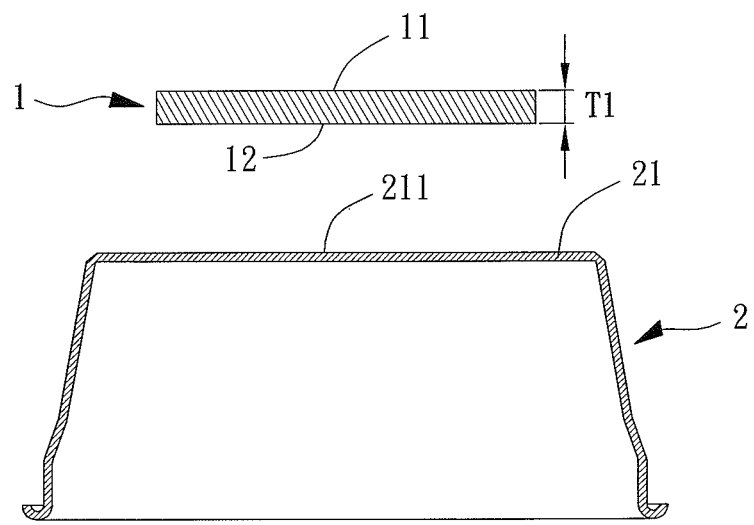
FIG. 2 shows a material preparation step of the method in which a first metal and a second metal are provided.

The material preparation step S1 is adapted to provide a first metal 1 and a second metal 2 as shown in FIG. 2. The first metal 1 has a first melting point and includes a first face 11 and a second face 12 opposite to the first face 11. The first metal 1 may have a thickness T1 of approximately 8 mm. When the first metal 1 is heated to the first melting point, the first metal 1 will start to melt and therefore become soft. The second metal 2 has a second melting point higher than the first melting point. The second metal 2 is in the form of a container having a bottom plate 21. The bottom plate 21 has an outer face 211 as shown in FIG. 2.

Figure 3:
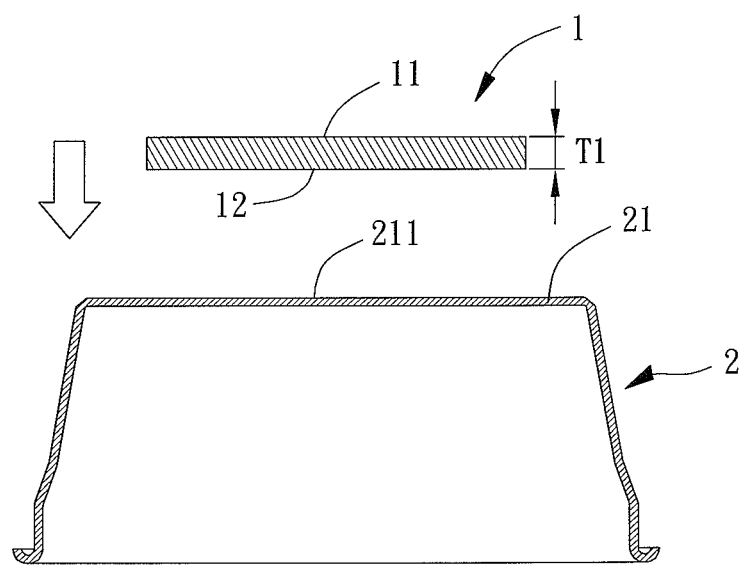
FIG. 3 shows a positioning step of the method in which the first metal is being positioned on a bottom plate of the second metal.

The positioning step S2 is adapted to position the first metal 1 on the bottom plate 21 of the second metal 2, as shown in FIG. 3. During the positioning step S2, the outer face 211 faces the first metal 1. When the first metal 1 is positioned on the bottom plate 21 of the second metal 2, the second face 12 of the first metal 1 is in contact with the outer face 211 of the bottom plate 21. In a preferred implementation, the first metal 1 may also be welded on the second metal 2 by spot welding or projection welding, to position the first metal 1 in a desired position on the bottom plate 21 of the second metal 2. In spot welding, the first metal 1 and the second metal 2 are joined by the heat obtained from resistance due to electric current flow. The spot welding process uses two shaped copper alloy electrodes to concentrate a welding current into a small "spot" and to simultaneously clamp the first metal 1 and the second metal 2 together. Forcing a large current through the spot will melt the first metal 1 and form the weld. The attractive feature of spot welding is that a lot of energy can be delivered to the spot in a very short time (approximately ten milliseconds). This permits the welding to occur without excessive heating to the rest of the first metal 1. Projection welding is a modification of the spot welding technique. In the process of projection welding, the weld is localized by use of raised sections or projections, on one or both of the metals to be joined. Heat is concentrated at the projections, which permits the welding of heavier sections or the closer spacing of welds. The projections can also serve as a ways of positioning the metals.

Figure 4:
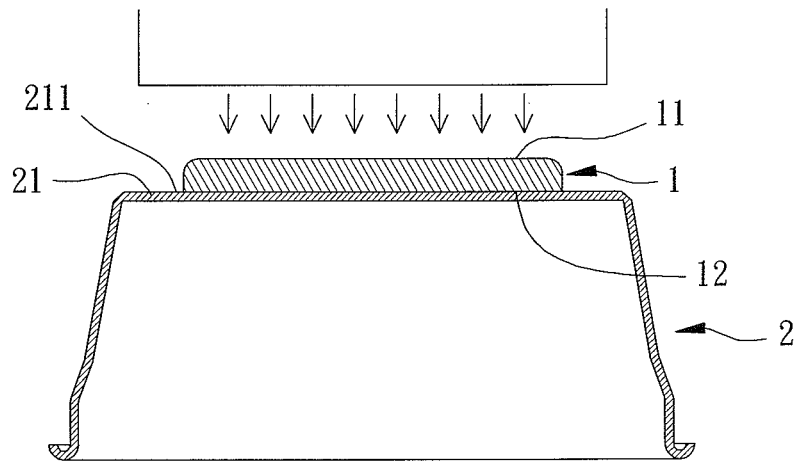
FIG. 4 shows a heating step of the method in which the first metal is heated to a semi-molten state.

After the first metal 1 is positioned on the bottom plate 21 of the second metal 2, the heating step S3 is adapted to heat the first and second metals until the first metal 1 turns into a semi-molten state, as shown in FIG. 4. The semi-molten state herein refers to a state in which the first metal 1 is partially molten and partially solid. Since the second metal 2 has a higher melting point than the first metal 1, the second metal 2 (in the form of a container) is still in a solid state (in the solid form) when the first metal 1 starts turning into the semi-molten state. In the heating step S3, the first metal 1 and the second metal 2 may be heated by way of radiofrequency. The first metal 1 must not be heated to a temperature that is much higher than the required temperature in order to prevent the liquefaction of the first metal 1. In this embodiment, the first metal 1 is aluminum having a melting point of approximately 400 degrees Celsius, and the second metal 2 is stainless steel having a melting point much higher than 400 degrees Celsius. Based on this, the first metal 1 and the second metal 2 are heated to approximately 400 degrees Celsius with a variation of 50 degrees Celsius. Under this temperature, aluminum starts to turn into the semi-molten state while stainless steel still remains in the solid state.

Figure 5A:
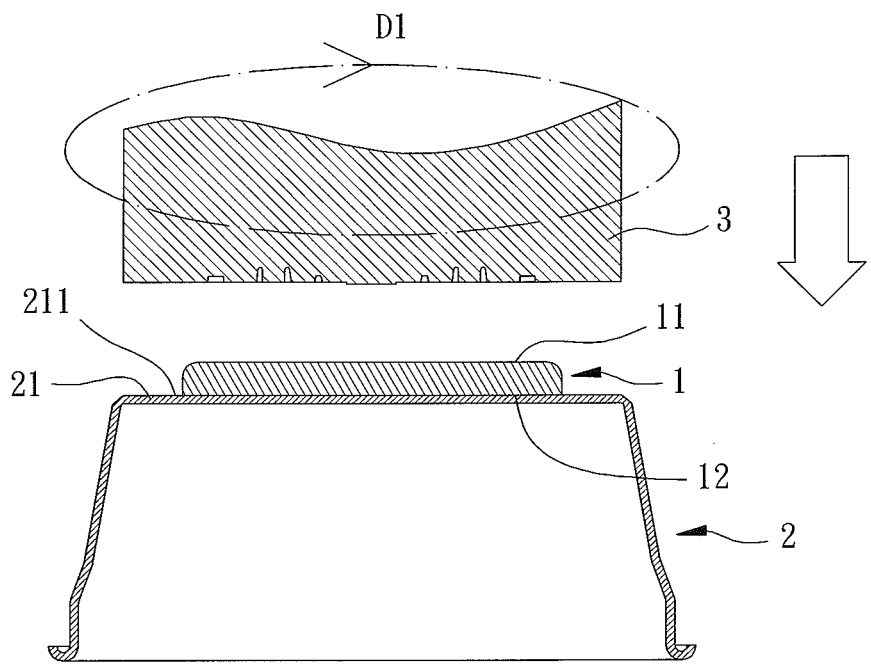
FIG. 5a shows a rotating and compressing step of the method in which a mold is rotating in a first direction and is constantly being compressed down towards the semi-molten first metal.
Figure 5B:
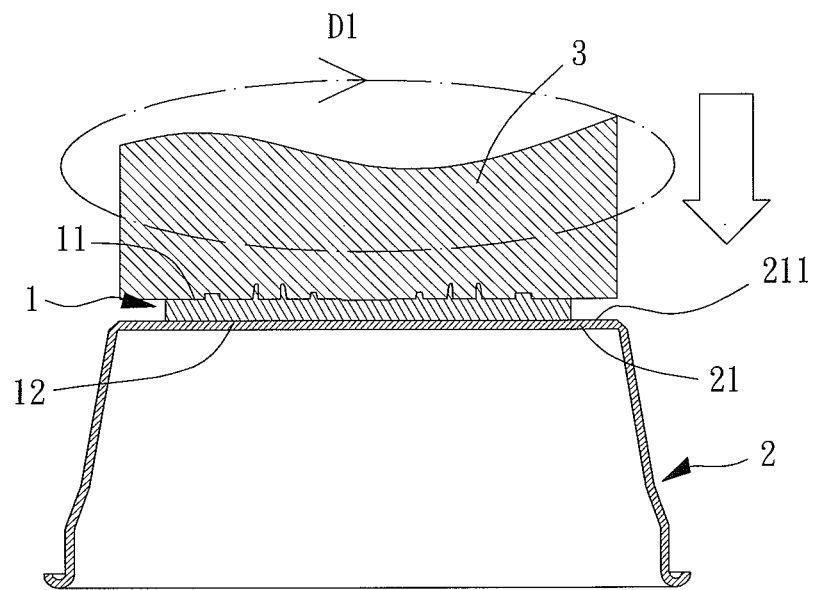
FIG. 5b shows the rotating and compressing step in which the mold just makes contact with the semi-molten first metal and keeps rotating in the first direction.
Figure 5C:
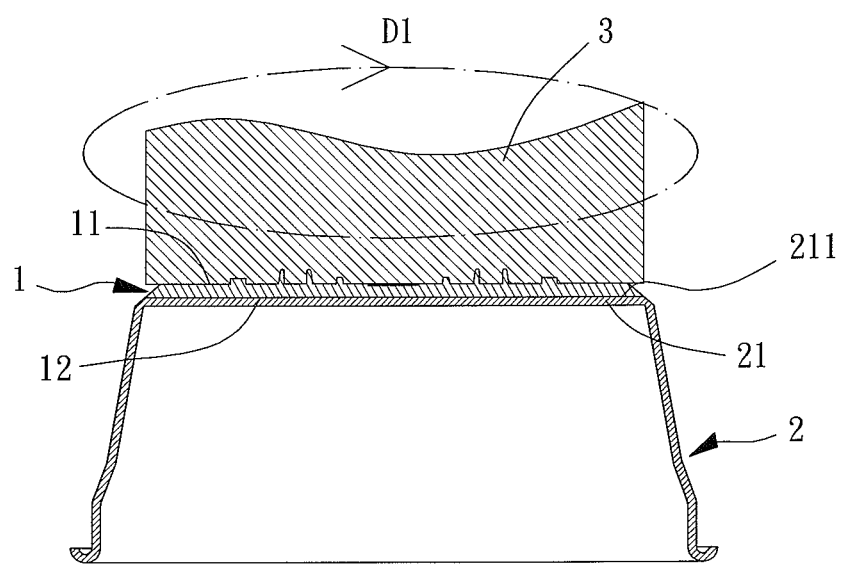
FIG. 5c shows the rotating and compressing step in which the mold keeps rotating in the first direction and is compressed further down on the semi-molten first metal to distribute the first metal along an outer face of the bottom plate of the second metal.

Based on the semi-molten state of the first metal 1, the rotating and compressing step S4 is adapted to rotate and compress a mold 3 onto the first face 11 of the first metal 1 in order to distribute the semi-molten first metal 1 along the outer face 211 of the second metal 2 to form an engagement portion (later numbered as 13 in FIGS. 8a and 8b) on the first face 11 of the first metal 1, as shown in FIGS. 5a, 5b and 5c. Specifically, in FIG. 5a, the mold 3 is compressed down towards the first metal 1 and rotates in a first direction D1 (clockwise direction if viewed from the top). In this stage, the mold 3 rotates at a relatively slower speed. As the mold 3 keeps rotating and is constantly being compressed towards the semi-molten first metal 1, the mold 3 will finally come into contact with the semi-molten first metal 1, as shown in FIG. 5b. At this time, the mold 3 continues to be compressed down and keeps rotating in the first direction D1 until a final position is reached. However, in this stage, the mold 3 rotates in a relatively higher speed to rapidly distribute the semi-molten first metal 1 along the outer face 211 of the second metal 2. In general, the mold 3 rotates in an increasing speed during the entire compression phase of the mold 3. The mold 3 stops at the final position in the rotating and compressing step S4. When the mold 3 stops, the semi-molten first metal 1 is completely distributed along the outer face 211 of the second metal 2 and the mold 3 is spaced from the outer face 211 of the second metal 2 by a distance. After the rotating and compressing step S4, the semi-molten first metal 1 can be firmly adhered to the outer face 211 of the second metal 2.

Figure 6:
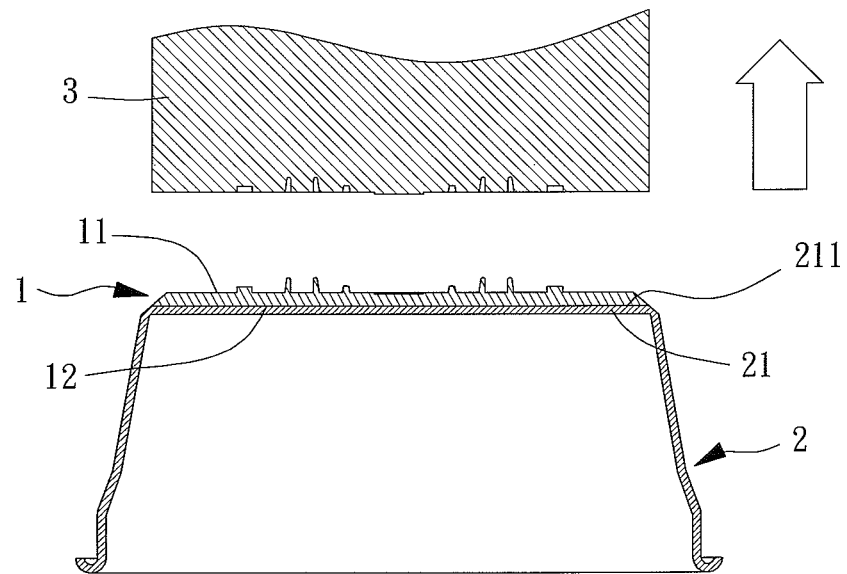
FIG. 6 shows a removing step of the method in which the mold is removed from the first metal by simply raising the mold.
Figure 7A:
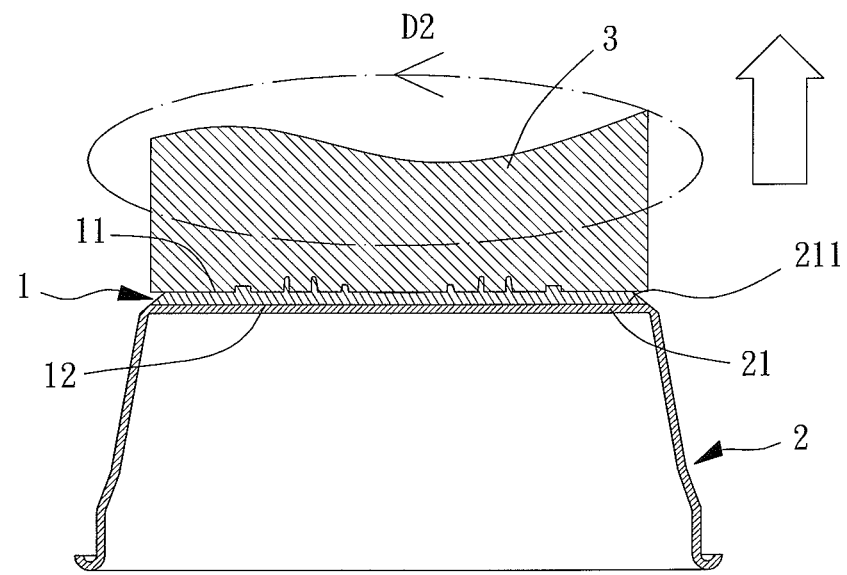
FIG. 7a shows another implementation of the removing step in which the mold is switched to rotate in a second direction opposite to the first direction when the mold is constantly being raised.
Figure 7B:
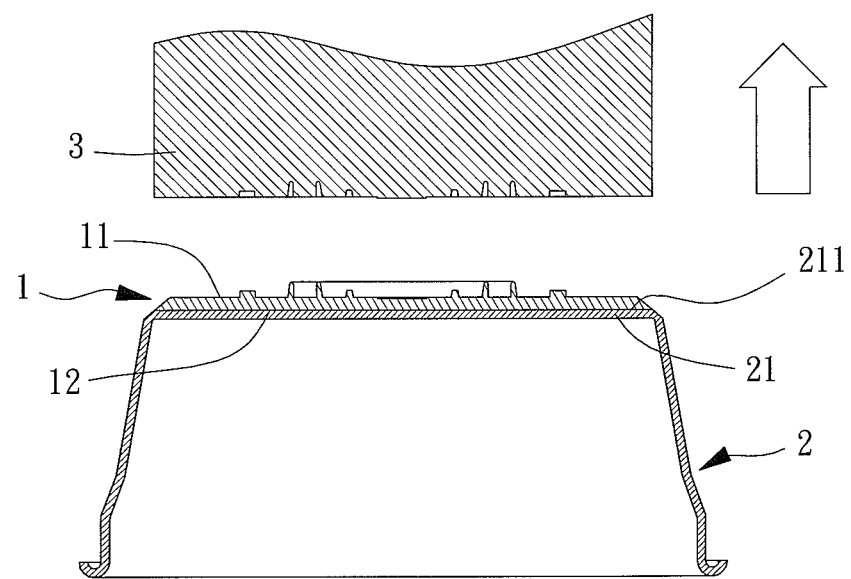
FIG. 7b shows the removing step of FIG. 7a in which the mold has been successfully removed from the first metal.
Figure 8A:
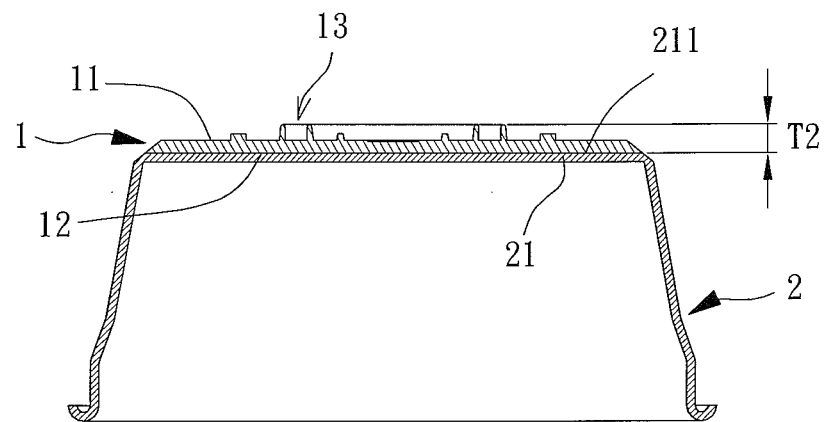
FIG. 8a shows the metal container having an engagement portion formed on the first metal.
Figure 8B:
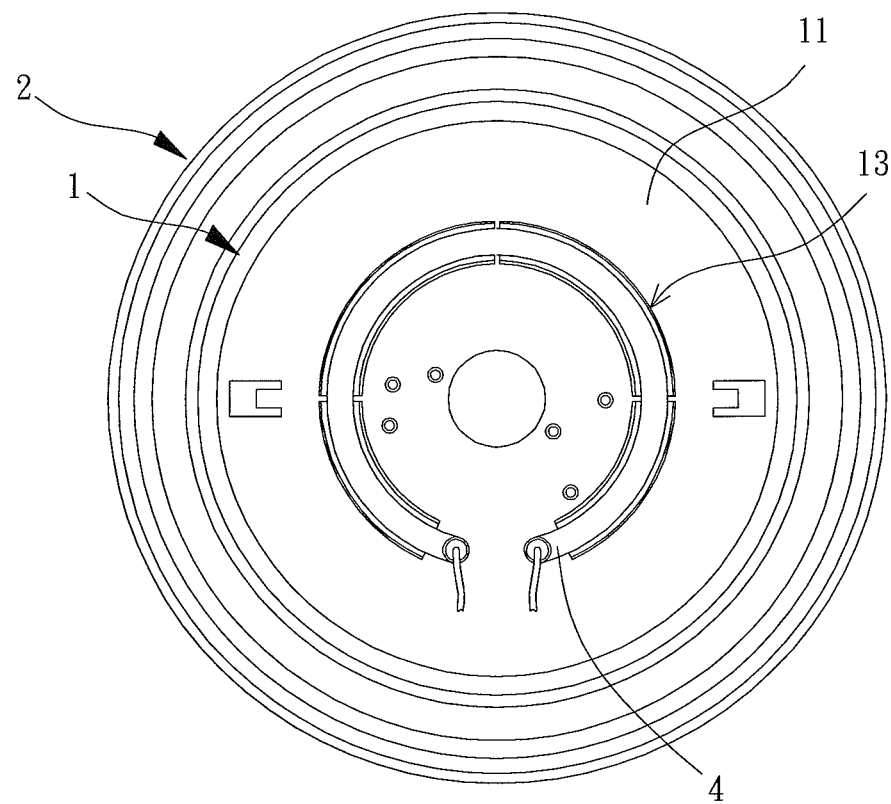
FIG. 8b is a top view of the metal container engaged with a heating member.

The removing step S5 is adapted to remove the mold 3 from the first metal 1. In the removing step S5, the mold 3 may be removed from the first metal 1 by simply raising the mold 3, as shown in FIG. 6. In other words, the mold 3 is raised to remove the mold 3 from the first metal 1. Alternatively, the mold 3 may be rotated in a second direction D2 opposite to the first direction D1 when the mold 3 is constantly being raised, as shown in FIGS. 7a and 7b. In this mechanism, since the mold 3 rotates in the second direction D2 when the mold 3 is raised, the rotating mold 3 will cut off a certain length of the first metal 1, making the first metal 1 thinner. The engagement portion 13 is formed on the first metal 1 when the mold 3 stops at the final position, as shown in FIGS. 8a and 8b.

The heating member installation step S6 is adapted to engage a heating member 4 with the engagement portion 13 to construct a metal container as a finished product. The heating member 4 may be any component capable of generating heat, such as an electric heating tube. In this embodiment, the heating member 4 is an electric heating tube. In this regard, when the heating member 4 is electrified to generate heat, the first metal 1 may serve as a heat-conducting member to transfer the heat from the heating member 4 to the second metal 2. As such, when the metal container is used to accommodate foods or water to be heated, the foods or water can be efficiently cooked or boiled. In this embodiment, since the first metal 1 is made of aluminum with excellent heat conductivity, the heat-conducting member (the first metal 1) is able to efficiently transfer the heat to the second metal 2. Furthermore, referring to FIG. 8a again, the first metal 1 may have a thickness T2 of approximately 4 mm after the mold 3 is removed from the first metal 1. The thickness T2 is about half the value of the thickness T1 of the first metal 1. In other words, the first metal 1 becomes thinner by one half compared to its original thickness after the compression stage.

In conclusion, the method is able to achieve convenient and fast manufacture of a metal container since the first metal 1 can be firmly coupled onto the second metal 2 and since the engagement portion 13 can be quickly formed on the first metal 1 at the same time by simply heating the first metal 1 to the semi-molten state and by rotating and compressing the mold 3 onto the semi-molten first metal 1. Advantageously, efficient manufacture and cost reduction are achieved.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A method for producing a metal container, comprising:
   providing a first metal and a second metal, wherein the first metal has a first melting point, wherein the second metal has a second melting point higher than the first melting point, wherein the first metal is adapted to form an engagement portion, wherein the second metal is in the form of a container having a bottom plate, wherein the first metal has a first face and a second face opposite to the first face, and wherein the bottom plate has an outer face facing the first metal;
   positioning the first metal on the bottom plate of the second metal, with the second face of the first metal in contact with the outer face of the bottom plate;
   heating the first and second metals until the first metal turns into a semi-molten state;
   rotating and compressing a mold onto the first face of the first metal in order to distribute the semi-molten first metal along the outer face of the second metal to form the engagement portion on the first surface of the first metal, thereby firmly adhering the first metal to the outer face of the second metal, wherein rotating and compressing the mold comprises rotating the mold in a first direction as the mold is constantly being compressed down on the first face of the first metal;
   removing the mold from the first metal and rotating the mold in a second direction opposite to the first direction as the mold is constantly being raised from the first metal; and
   engaging a heating member with the engagement portion of the first metal.

2. The method for producing the metal container as claimed in claim 1, wherein positioning the first metal further comprises welding the first metal on the bottom plate of the second metal by spot welding or projection welding.

3. The method for producing the metal container as claimed in claim 1, wherein rotating the mold further comprises rotating the mold in an increasing speed as the mold is constantly being compressed down on the first face of the first metal.

4. A method for producing a metal container as claimed in claim 1, wherein removing the mold further comprises removing the mold from the first metal by raising the mold.

5. The method for producing the metal container as claimed in claim 1, wherein the first metal is aluminum, wherein the second metal is stainless steel, and wherein heating the first and second metals further comprises heating the aluminum and the stainless steel to approximately 400 degrees Celsius.

6. The method for producing the metal container as claimed in claim 1, wherein heating the first and second metals comprises heating the first and second metals by way of radiofrequency.

7. The method for producing the metal container as claimed in claim 1, wherein the heating member is an electric heating tube.

8. A method for combining two metals of a metal container, comprising:
   providing a first metal and a second metal, wherein the first metal has a first melting point, wherein the second metal has a second melting point higher than the first melting point, wherein the first metal is adapted to form an engagement portion, wherein the second metal is in the form of a container having a bottom plate, wherein the first metal has a first face and a second face opposite to the first face, and wherein the bottom plate has an outer face facing the first metal;
   positioning the first metal on the bottom plate of the second metal, with the second face of the first metal in contact with the outer face of the bottom plate;
   heating the first and second metals until the first metal turns into a semi-molten state;
   rotating and compressing a mold onto the first face of the first metal in order to distribute the semi-molten first metal along the outer face of the second metal to form the engagement portion on the first surface of the first metal, thereby firmly adhering the first metal to the outer face of the second metal, wherein rotating and compressing the mold comprises rotating the mold in a first direction as the mold is constantly being compressed down on the first face of the first metal; and
   removing the mold from the first metal and rotating the mold in a second direction opposite to the first direction as the mold is constantly being raised from the first metal.

9. The method for combining two metals of a metal container as claimed in claim 8, wherein positioning the first metal further comprises welding the first metal on the bottom plate of the second metal by spot welding or projection welding.

10. The method for combining two metals of a metal container as claimed in claim 8, wherein rotating the mold further comprises rotating the mold in an increasing speed as the mold is constantly being compressed down on the first face of the first metal.

11. The method for combining two metals of a metal container as claimed in claim 8, wherein removing the mold further comprises removing the mold from the first metal by raising the mold.

12. The method for combining two metals of a metal container as claimed in claim 8, wherein the first metal is aluminum, wherein the second metal is stainless steel, and wherein heating the first and second metals further comprises heating the aluminum and the stainless steel to approximately 400 degrees Celsius.

13. The method for combining two metals of a metal container as claimed in claim 8, wherein heating the first and second metals comprises heating the first and second metals by way of radiofrequency.

\* \* \* \* \*